(12) United States Patent
Walters et al.

(10) Patent No.: US 10,521,799 B1
(45) Date of Patent: Dec. 31, 2019

(54) SYSTEM AND METHOD FOR CREATING AUTOMATIC EXPIRING TRANSACTIONS FOR A CREDIT CARD

(71) Applicant: Capital One Services, LLC, McLean, VA (US)

(72) Inventors: Austin Grant Walters, Savoy, IL (US); Jeremy Edward Goodsitt, Champaign, IL (US); Fardin Abdi Taghi Abad, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/517,203

(22) Filed: Jul. 19, 2019

(51) Int. Cl.
G06Q 20/40 (2012.01)
G06Q 20/24 (2012.01)
G06Q 20/38 (2012.01)

(52) U.S. Cl.
CPC .......... *G06Q 20/409* (2013.01); *G06Q 20/24* (2013.01); *G06Q 20/385* (2013.01); *G06Q 20/403* (2013.01); *G06Q 2220/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,589,268 | B2* | 3/2017 | Hammad | G06F 21/34 |
| 2013/0144776 | A1* | 6/2013 | Webster | G06Q 40/025 705/38 |
| 2015/0262291 | A1* | 9/2015 | West | G06Q 40/025 705/14.66 |
| 2018/0330383 | A1* | 11/2018 | Pontious | G06Q 20/351 |

OTHER PUBLICATIONS

Author unknown, "Payment Tokenization Explained", Square, Inc. website, [online] 2019 [retrieved on Jun. 28, 2019]. Retrieved from Internet URL: https://squareup.com/townsquare/what-does-tokenization-actually-mean, 8 pages.
Author unknown, "Tokenization (data security)", Wikipedia [online] 2019 [retrieved on Jun. 28, 2019]. Retrieved from Internet URL: https://en.wikipedia.org/wiki/Tokenization_(data_security), 8 pages.
Author unknown, "Flow Does Tokenization Work?", BluePay website [online] [retrieved on Jun. 28, 2019]. Retrieved from Internet URL: https://blog.bluepay.com/how-does-tokenization-work, 5 pages.

(Continued)

*Primary Examiner* — Asha Puttaiah

(57) ABSTRACT

A system and method are disclosed in which a user engaging in an online or in-person transaction with a merchant may create automatic expiring transactions for a credit card. The user provides the credit card information to an online interface or a point-of-sale device but specifies an expiration date that is on or before the actual expiration date of the credit card, known as an artificial expiration date. A token for the merchant is generated with the artificial expiration date. The issuing bank will honor the transaction with the artificial expiration date using the merchant-specific token, and the token may continue to be used with the online merchant until the artificial expiration date.

7 Claims, 11 Drawing Sheets

(56) References Cited

OTHER PUBLICATIONS

Owen, B., Screen captures from YouTube video clip entitled "What Is Tokenization", YouTube [online] Dec. 8, 2015 [retrieved on Jun. 28, 2019]. Retrieved from Internet URL: https://www.youtube.com/watch?v=iVeenkfa-0s, 3 pages.

Author unknown, "Payment processor", Wikipedia [online] [retrieved on Jun. 28, 2019]. Retrieved from Internet URL: https://en.wikipedia.org/wiki/Payment_processor, 3 pages.

Author unknown, Screen captures from YouTube video clip entitled "How Credit Card Processing Works—Transaction Cycle & 2 Pricing Models", YouTube [online] Apr. 4, 2014 [retrieved on Jun. 28, 2019]. Retrieved from Internet URL: https://www.youtube.com/watch?v=avRkRuQsZ6M, 3 pages.

Author unknown, Screen captures from YouTube video clip entitled "APIs 101: What Exactly is an API? Part 1", YouTube [online] Jul. 7, 2017 [retrieved on Jun. 28, 2019]. Retrieved from Internet URL: https://www.youtube.com/watch?v=cpRcK4GS068, 3 pages.

Brame, D., "Stripe vs PayPal", Zapier [online] Aug. 27, 2018 [retrieved on Jun. 28, 2019]. Retrieved from Internet URL: https://zapier.com/blog/stripe-vs-paypal/, 13 pages.

Author unknown, Screen captures from YouTube video clip entitled "Google Pay API Explained", YouTube [online] Oct. 19, 2018 [retrieved on Jun. 28, 2019]. Retrieved from Internet URL: https://www.youtube.com/watch?v=rP_UAPcIG4I, 3 pages.

Author unknown, "The new standard in online payments", Stripe [online] [retrieved on Jun. 28, 2019]. Retrieved from Internet URL: https://stripe.com/, 3 pages.

PayPal editorial staff, Screen captures from website "Payment gateway: the technology behind the sale", Aug. 21, 2018 [online] [retrieved on Jun. 28, 2019]. Retrieved from Internet URL: https://www.paypal.com/us/brc/article/what-is-a-payment-gateway, 3 pages.

Author unknown, Screen captures from YouTube video clip entitled, "What is a Payment Gateway—3 Ways to Use a Merchant Account Gateway", YouTube [online] Apr. 13, 2017 [retrieved on Jun. 28, 2019]. Retrieved from Internet URL: https://www.youtube.com/watch?v=kBCR-gm058M, 3 pages.

Johnson, T., "I'd Rather Be Writing—exploring technical writing trends and innovations", DISQUS blog [online] Sep. 4, 2015 [retrieved on Jun. 28, 2019]. Retrieved from Internet URL: https://idratherbewriting.com/2015/09/04/authorizing-apis/#defining-terms, 11 pages.

* cited by examiner

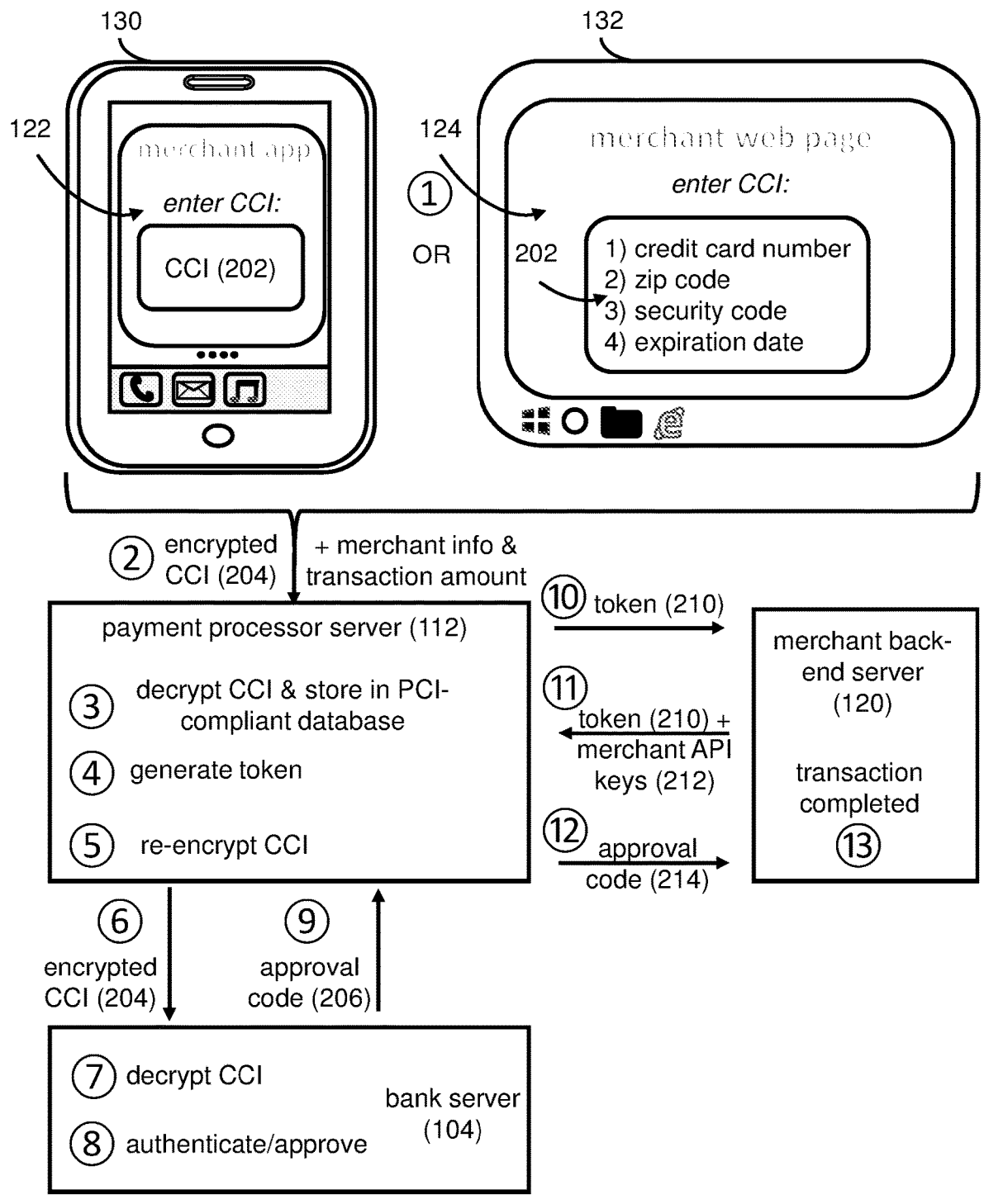
Figure 2A  method for user-initiated token generation (200)
200A

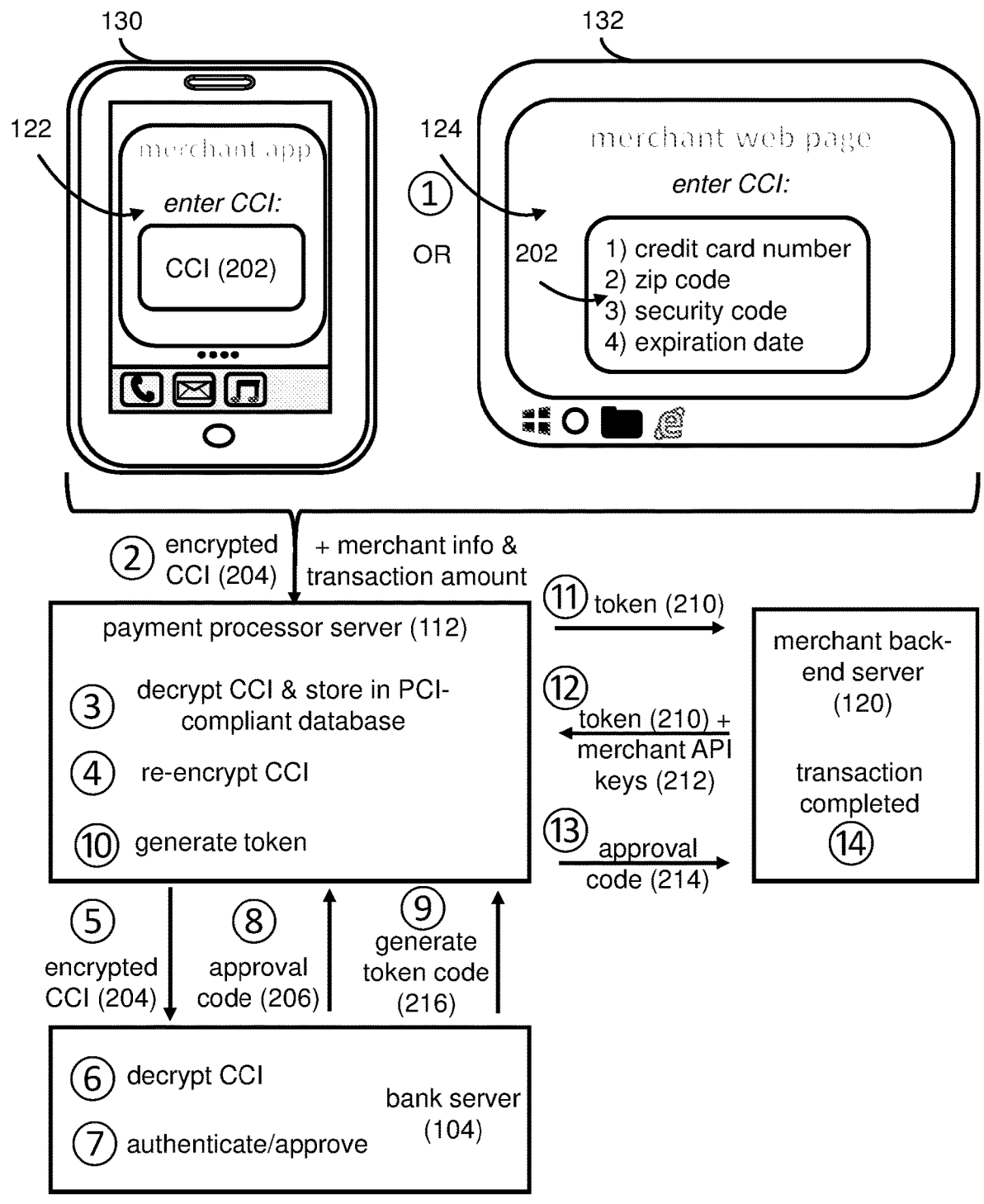
Figure 2B  method for user-initiated token generation (200)

300A

300B

400

SYSTEM AND METHOD FOR CREATING AUTOMATIC EXPIRING TRANSACTIONS FOR A CREDIT CARD

BACKGROUND

Online transactions are very popular with consumers. A merchant who has online interfaces, such as a web page and/or mobile application, typically contracts with a payment processing system to manage sensitive information, such as credit card numbers. The merchant online interface automatically sends the sensitive information to the payment processing system, which determines whether the transaction may be completed.

SUMMARY

This disclosure presents various systems, components, and methods related to creating automatic expiring transactions for a credit card. Each of the systems, components, and methods disclosed herein provide one or more advantages over conventional systems, components, and methods.

Various embodiments include techniques for creating automatic expiring transactions for a credit card. In one embodiment, an apparatus, comprises a processor and a memory coupled to the processor, the memory comprising instructions that, when executed by the processor, cause the processor to receive a request to make a payment to a merchant from a payment processing system, wherein the payment is to be made from a customer's credit card, the request to include an expiration date that is different from a second expiration date associated with the credit card, confirm that the expiration date is prior to the second expiration date, confirm that the expiration date is after a current date, and either approve the request to the payment processing system upon authentication of the credit card of the customer, or deny the request to the payment processor.

In another embodiment, at least one machine-readable storage medium comprises instructions that, when executed by a processor, cause the processor to receive encrypted information from a payment processing system, the encrypted information comprising a credit card number and an expiration date, decrypt the encrypted information to obtain the credit card number and the expiration date, and authenticate the credit card number by comparing the credit card number to a database of saved credit card numbers, approve a transaction using the credit card even though the expiration date is on or before an actual expiration date associated with the credit card number, wherein a token having the expiration date is to be used for transactions with a merchant, wherein the merchant was given the expiration date during processing of an initial transaction with the merchant.

In another embodiment, an apparatus comprises a processor and a memory coupled to the processor, the memory comprising instructions that when executed by the processor cause the processor to decrypt an encrypted transaction object, the encrypted transaction object comprising credit card information including an artificial expiration date, authenticate the credit card information by consulting a database of credit card information for a plurality of bank customers, confirm, by consulting the database of credit card information, that the artificial expiration date is on or before an actual expiration date associated with the credit card number, and approve a transaction using the credit card information and the artificial expiration date.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIGS. 2A and 2B are simplified block diagrams of a method for creating automatic expiring transactions for a credit card, according to some embodiments.

DETAILED DESCRIPTION

Figure 1:
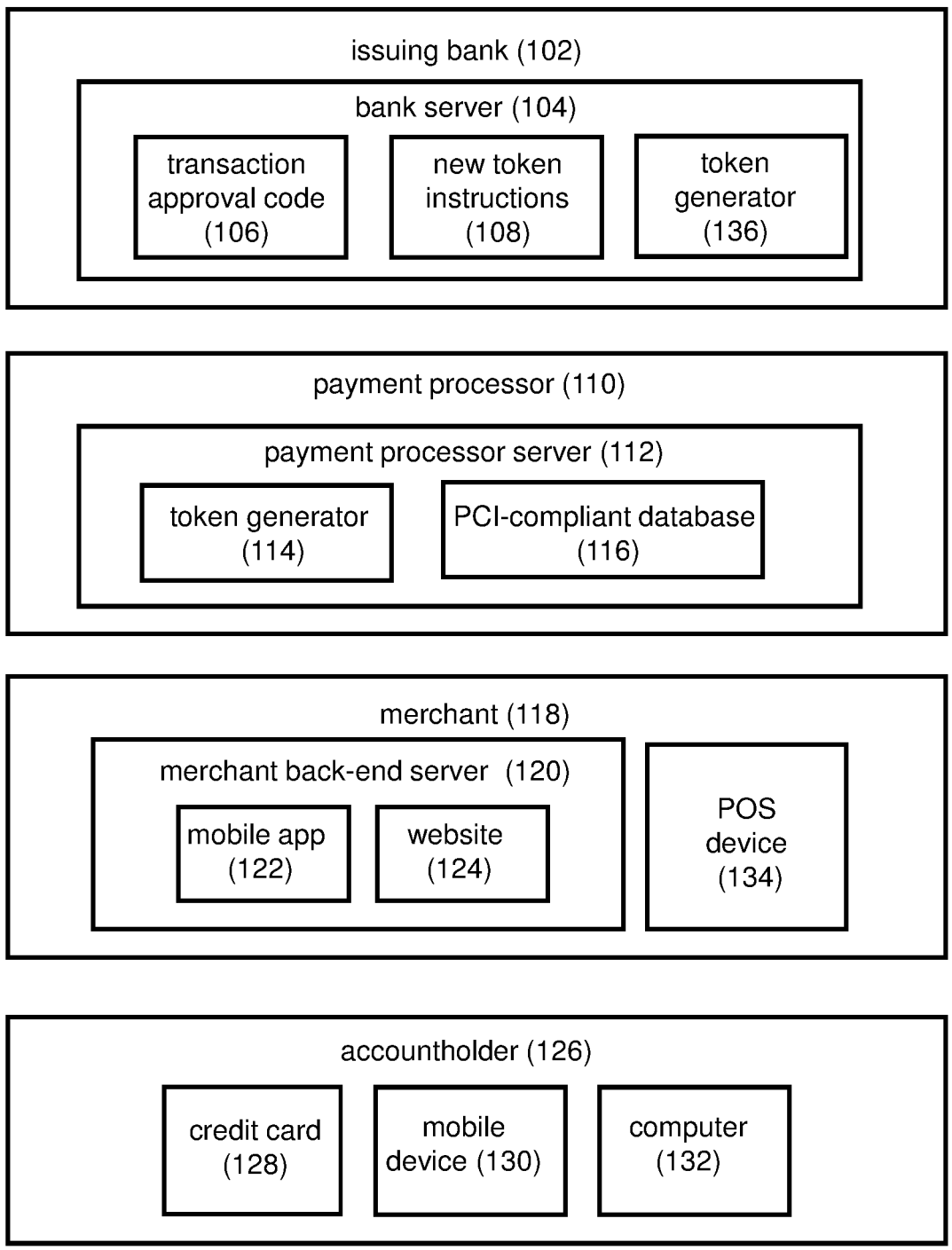
FIG. 1 is a simplified block diagram of a system for creating automatic expiring transactions for a credit card, according to some embodiments.

In accordance with the embodiments described herein, a system and method are disclosed in which a user engaging in an online or in-person transaction with a merchant causes an automatically expiring merchant-specific token to be generated and used for the transaction. The merchant-specific token is associated with a credit card of the user, and the user may specify an expiration date that is on or before the actual expiration date of the credit card, known as an artificial expiration date. The issuing bank will honor the transaction with the artificial expiration date using the merchant-specific token, and the token may continue to be used with the online merchant until the artificial expiration date.

Evolution of the Banking Relationship

Banks and other financial institutions provide a number of different services involving finances, most notably, a checking or savings account. Hereinafter, a reference to a "bank" is meant to encompass other financial institutions, including, but not limited to credit unions, savings and loan institutions, financial services providers, and so forth. Initially, a customer of a bank would rely on a passbook, a booklet issued by the bank, enabling the accountholder to personally record how much money had been deposited or withdrawn from the account. More recently, an accountholder would receive a statement, usually monthly, in the mail.

With the advent of personal computers, banks began providing account statements by electronic mail for those users who selected the feature, such as being part of the institution's "paperless" option. Today, many banks enable customers to access their account information by way of a personal computer, laptop, tablet, notebook, pad, personal digital assistant, or other devices that have access to the Internet. By accessing a web page and providing a username and password as authentication, the user is able to receive a wealth of information about the bank account, including recent purchases and deposits, transaction entities, bank statements, and so on. These web accesses also enable transactions to take place, known colloquially as "online banking" in which automatic payments may be scheduled and money may be transferred between different accounts of the user, to a third-party account within the same bank, and even to third-party accounts with another bank. Relying on this Internet-based access, today's accountholder may view the current balance of an account twenty-four hours a day, seven days a week.

With the proliferation of hand-held device technology, such as smart phones, many banks have made applications (known colloquially as "apps") available to their customers. As long as the smartphone is able to access the Internet, the bank may provide a downloadable app for accessing a customer's bank account from the smartphone. Similar to the web page, the app, once selected, will generally request a username and password to authenticate the user. Alternatively, some apps enable access using a fingerprint or voiceprint to authenticate the user. Once authenticated, the user is able to review the account, such as to obtain balance information, scroll through transactions, make transfers to another account, deposit checks, and so on. These apps are intended to enhance the convenience for the accountholder. So, in addition to being able to access one's checking account by accessing a web page, a user may similarly access the account by enabling the app on a smartphone.

System for Creating Automatic Expiring Transactions for a Credit Card

FIG. 1 is a simplified block diagram of a system for creating automatic expiring transactions for a credit card 100, according to some embodiments. The system 100 includes a bank system 102, a payment processing system 110, a merchant or vendor system 118, and an accountholder system 126. The bank 102 includes a bank server 104, and the accountholder 126 may have one or more accounts, such as a checking or savings account, with the bank. The accountholder 126 may also have one or more credit cards 128 that were issued by the bank 102. Thus, the bank 102 is also known as an issuing bank. The accountholder 126 is able to communicate with the merchant or vendor 118 by way of a merchant application, known colloquially as an app 122, where the merchant app is to be loaded onto a mobile device 130 of the accountholder, by way of a website 124 viewable from a computer 132. Alternatively, the accountholder 126 communicates with the merchant in person at the premises of the merchant. Collectively, the mobile app 122 and website 124 are known herein as online interfaces or merchant online interfaces. The accountholder 126 may use either or both types of merchant online interfaces. The accountholder may also be referred to herein as a customer, a bank customer, and a user.

In some embodiments, the system for creating automatic expiring transactions for a credit card 100 pertains to online transactions between the merchant 118 and the accountholder 126. In some embodiments, an online transaction or online purchase is one in which a user selects goods or services offered by a merchant by viewing a web page (from a computer) or mobile app (from a mobile device), the web page and the mobile app having been created by the merchant, and using a credit card to complete a purchase of the selected goods or services. In other embodiments, the system for creating automatic expiring transactions for a credit card 100 pertains to in-person transactions with a merchant, where the accountholder 126 uses the credit card 128 with a point-of-sale (POS) device 134 at the merchant, to complete a transaction for goods or services.

In some embodiments, the system for creating automatic expiring transactions for a credit card 100 enables the accountholder 126 to enter an expiration date other than the actual expiration date shown on the credit card 128 (an artificial expiration date) during an online transaction. As used herein, the actual expiration date is the date associated with the credit card's expiration, that is, the date after which the credit card may not be used, where the actual expiration date is generally stamped directly on the physical card. The artificial expiration date is a date which is the same as or prior to the actual expiration date, and which is specified by the accountholder during online or in-person transactions with a merchant. Once the artificial expiration date is entered at the merchant online interface or at a point-of-sale (POS) device at the merchant premises, a merchant-specific token is generated, usable only for transactions at the merchant, in which the token will expire on the artificial expiration date entered by the accountholder. The merchant-specific token is generated with the artificial expiration date. Neither the payment processing system 110 nor the merchant system 118 knows the artificial expiration date is different from the actual expiration date on the card. Instead, both the payment processing system 110 and the merchant system 118 see the artificial expiration date of the token and process transactions using the token until the artificial expiration date. In some embodiments, the tokenization of the credit card information at the merchant mobile app 122, the merchant website 124, or at the merchant POS device, ensures that the merchant is unable to overcharge the customer against their wishes.

In some embodiments, the system for creating automatic expiring transactions for a credit card 100 enables the accountholder 126 to enter the artificial expiration date during an in-person transaction. For example, the accountholder may specify the artificial expiration date by manually entering the credit card number plus the artificial expiration date at the POS device at the merchant location.

The bank server 104, which may be more than one server, is controlled by the bank. The bank server 104 is a processor-based computing system of the bank, which may be on the premises of the bank or at another location, may be a cloud server or may be a combination of on-premises, off-premises, and cloud-based computing. The bank server 104 includes software executed by a processor, to issue a transaction approval code 106 to the payment processing system 110. The transaction approval code 106 is to be issued to the payment processing system once the bank verifies the transaction as valid. In some embodiments, the transaction approval code 106 is issued even though the accountholder has entered an artificial expiration date.

Similarly, the payment processing system 110 and the merchant system 118 include respective servers 112 and 120, each of which may consist of multiple server devices and may include on-premises, off-premises, and/or cloud-based computing. The merchant system 118, also known as a vendor system, is the entity from which the accountholder 126 is able to make online or in-person purchases of goods or services. The bank server 104, payment processing system server 112, and merchant server 120 communicate with one another using Application Programming Interface (API) calls. Sometimes known as a payment gateway, a merchant gateway, pay gate, or online gateway, the APIs are software that connects between the bank server 104 to the payment processing system server 112, as well as between the payment processing system server and the merchant server 120.

The payment gateway captures and encrypts sensitive information, such as a credit card number, before any transmission, thus ensuring a secure transmission of the information between the servers.

Payment processing systems are involved in virtually every transaction involving a credit or debit card, whether online or from Point of Sale (POS) devices. Payment processing systems are companies that handle credit and debit card transactions on behalf of merchant acquiring banks. Merchant acquiring banks, also known as acquirers, are banks that enter into contracts with the merchants so that the merchants are able to accept credit or debit card payments in exchange for goods or services. Issuing banks are banks that issue credit cards to their bank customers. For example, the bank 102 in FIG. 1 issues the credit card 128 to the accountholder 126 and is thus an issuing bank.

In some embodiments, the payment processing system server 112 includes a token generator 114 and, like the bank server, software to generate a transaction approval code 116. The token generator 114 is software of the payment processing system server 112 that causes the token to be generated and sent to the merchant, the merchant being determined based on where the credit card information was entered, whether from the merchant's online interface or from a POS device on the merchant premises. The resulting token is to be used in one or more transactions between the accountholder 126 and the merchant 118, as described in more detail below.

Payment Processing System

In exchange for goods or services offered by a merchant, a credit card holder presents a credit card to the merchant. A credit card holder is an individual to whom a credit card was issued by an issuing bank. If the transaction is in person, the merchant has a POS device and associated software that electronically reads the credit card information. If the transaction is from a website or mobile app, the credit card information is entered into a form embedded as part of the website or mobile app.

The credit card information as well as the amount of the purchase is then sent electronically to the payment processing system. For online and in-person transactions, the electronic transmission is securely sent through the payment gateway. The payment processing system forwards the electronic information to a credit card network, such as VISA®, MASTERCARD®, or AMERICAN EXPRESS®. The credit card network forwards the electronic information to the issuing bank. The issuing bank knows whether the credit card holder has sufficient funds to honor the transaction with the merchant and, based on this information, sends a reply in digital form back across the network, to be received at the merchant POS device, website, or mobile app. The digital reply is either an approval code or a denial code. The passing of the electronic information between the merchant and the payment processing system, the payment processing system, and the credit card network, and the credit card network and the issuing bank occur using API calls.

Assuming the credit card holder has the funds or approved credit available, the issuing bank approves the transaction by issuing the approval code, which is sent to the credit card network, which then forwards the approval code to the payment processing system. The payment processing system forwards the approval code to the merchant and the transaction between the credit card holder and the merchant is approved. These transactions are also done electronically, using API calls. As long as the there is no disruption to the payment processing network, these steps generally are completed in a few seconds. In exchange for swiping the credit card for the specified amount at the POS device or entering the credit card information into the web or mobile app form, the credit card holder receives goods or services from the merchant.

Once the transaction is complete, additional processing takes place. The issuing bank sends money for the amount of the transaction (in electronic form) to the payment processing system as reimbursement for the transaction the bank just approved. At the end of the day (or at the end of a specified time period), the merchant sends all transactions made using credit or debit cards, known as a batch, to the payment processing system. The payment processing system sends the batch to the merchant bank and the amount of the daily (or specified time period) deposits is credited to a bank account of the merchant at the merchant bank. Finally, the issuing bank sends a credit card bill to the credit card holder, so that the issuing bank will be reimbursed for the money sent to the payment processing system.

Thus, the payment processing system is an intermediary between the merchant and the credit card network, between the merchant and the merchant bank, and between the issuing bank and the merchant bank. Similarly, in the system for creating automatic expiring transactions for a credit card 100 (FIG. 1), the payment processing system 110 is an intermediary between the bank system 102 and the merchant system 118. For simplicity, the credit card network entity is not shown in the figures. The payment processing system 110 may also generate the token to be used by the accountholder 126, as explained in more detail below.

Online merchants typically do not see credit card information directly. Instead, they receive the credit card information in tokenized form, in part, to protect the merchant from having to store the sensitive data found on a credit card. The Payment Card Industry Data Security Standard (PCI DSS) is an information security standard mandated by credit card brands to increase controls around credit card data, which, in turn, is designed to protect against credit card fraud. Any merchant, including an online merchant, that wants to process, store, or transmit credit card data is expected to be PCI compliant. Because the payment gateway is designed to securely pass the sensitive credit card data from the form on the merchant's website or from the POS device at the merchant premises to the payment processing system, many online merchants will use a payment gateway to maintain compliance with the PCI DSS standards.

The payment processing system 110, by contrast, has robust mechanisms in place to protect the security of accountholder data. The payment processing system may maintain a firewall, use regularly updated anti-virus software, and execute secure applications, for example, to protect data stored in its PCI-compliant database 116, and may also limit access to the database by its employees. The payment processing system further employs cryptographic security measures, such as by encrypting and hashing, before the data is stored.

Token Generation

Tokens are increasingly used as a security measure against fraud, both for online transactions and for point-of-sale transactions at a merchant. Tokens are generated using an algorithm to replace the original credit card number with a series of randomly generated numbers or a randomly generated code. The use of tokens rather than original credit card numbers facilitates PCI compliance by the merchant, since the merchant does not have access to the original credit card numbers. Once the credit card is entered into the POS device of a merchant, the randomly generated token is only valid for purchases at the merchant. Similarly, once the credit card information is entered into an online interface of the merchant, the token is only valid at the merchant.

Method for Creating Automatic Expiring Transactions for a Credit Card

FIGS. 2A and 2B are schematic diagrams of a method for creating automatic expiring transactions for a credit card 200A and 200B (collectively, "method 200"), according to some embodiments. The method 200 is to be used during online transactions with a merchant and enables the accountholder to cause a merchant-specific token to be generated for the purchase. In FIG. 2A, the operations of the accountholder are described, while in FIG. 2B, the operations of the payment processing system server 112, the merchant server 120, and the bank server 104 are described. Although the reference numbers in FIG. 2B suggest an ordered progression, it will become apparent that the described steps may take place in an order other than is illustrated. Furthermore, one or more of these steps may take place simultaneously.

Starting with the accountholder operations in FIG. 2A, the mobile device 130 and the computer 132 (FIG. 1) are shown, either one of which may be used by the accountholder 126 (not shown) to invoke a merchant online interface with which the accountholder may engage in an online transaction with the merchant 118. Further, a POS device 134 is featured for in-person transactions with the merchant.

The accountholder may communicate with a merchant using the mobile app 122 loaded onto the mobile device 110. Alternatively, the accountholder may communicate with a merchant by opening a website 124 loaded onto a computer display 132. As a third alternative, the accountholder may shop in person at the merchant premises and interact with a POS device during checkout. In any of these three circumstances, the merchant app 122, the merchant web page 124, or the POS device 134 are requesting credit card information (CCI) from the accountholder. The credit card information consists of a credit card number, a zip code of the user, optionally, a security code, and an expiration date. In some embodiments, at this point, the accountholder enters the artificial expiration date. From one of the two merchant online interfaces 122 (merchant mobile app) or 124 (merchant web page), or at the POS device 134, the accountholder enters the credit card information including the artificial expiration date 202.

Whether from a form on one of the merchant online interfaces or from the POS device, a payment gateway captures the CCI including the artificial expiration date 202. A merchant identifier (ID) 204 and the transaction amount 206 are also part of the data gathered. The payment gateway encrypts the sensitive data, shown as an encrypted transaction object 208, before any transmission takes place. The encrypted transaction object 208 is then securely transmitted to the payment processing system server 112 (FIG. 2B). For example, RSA-style encryption, a type of public-key encryption, may be used. The merchant ID 204 may be, for example, a merchant-specific identifier, such as a merchant account number with the payment processing system, as well as a merchant token, which is used to authenticate the merchant to the payment processing system.

In FIG. 2B, although the operations are taking place between the bank 102, the payment processing system 110, and the merchant 118, the respective servers of each entity are featured, namely, the bank server 104, the payment processing system server 112, and the merchant server 120. The communication between these servers is by way of API calls. The operations of FIG. 2B commence once the encrypted transaction object 208 (FIG. 2A) is generated.

Within the payment process system server 112, the merchant server 120, and the bank server 104, different method operations are performed. Reference numbers 210-234 refer to distinct method operations, referred to herein as blocks. First, at the payment processing system server 112, the encrypted transaction object 208, containing the CCI including the artificial expiration date 202, the merchant ID 204, and the transaction amount 206, is decrypted (block 210). From the decrypted objects, the payment processing system server 112 generates a token having the artificial expiration date (block 212). The token is associated with both the credit card information of the accountholder and the merchant, although the former is known only to the bank server 104 and the latter is known only to the payment processing system server 112. Because the payment processing system server 112 has the merchant ID from the decrypted transaction objects, the payment processing system server knows where to send the token. Accordingly, the payment processing system server 112 sends the token to the merchant based on the merchant ID (block 214), with the transmission being via an API call. The payment processing system server 112 also re-encrypts the transaction objects (block 216) before the sensitive data is forwarded to the bank server 104 (block 218). A credit card network intermediary may also be part of the process, but, for simplicity, is not shown.

At the bank server 104, the re-encrypted transaction objects received from the payment processing system server 112 are decrypted, resulting in the CCI including the artificial expiration date 202, the merchant ID 204, and the amount of the transaction 206 (block 220). By consulting its credit card database 106, the bank will know whether the CCI 202 is that of one of its accountholders and thus performs authentication operations (block 222). By comparing the CCI 202 with the database 106, the bank server 104 will know if the accountholder indicated an artificial expiration date and will be able to confirm whether the artificial expiration date is on or before the actual expiration date (and is also on or after the current date). In some embodiments, if the CCI 202 includes the artificial expiration date and is otherwise legitimate, the bank server 104 will approve the transaction using the artificial expiration date (block 224). Using its transaction approval code software 106, the bank server 104 sends a transaction approval code 106 to the payment processing system server 112 (block 226).

Meanwhile, the merchant server 120 has received the token with the artificial expiration date from the payment processing system server 112 (block 228). This may occur before the bank server has sent the approval code to the payment processing system server. The token is a representation of the original CCI including artificial expiration date 202, but the merchant server 120 has no knowledge of the original credit card information. However, some information about the original credit card information is available to the merchant, namely, the artificial expiration date (but the merchant is unaware that the date is user-generated).

Next, the merchant server 120 sends, in an API call, a combination of the token and merchant API keys, to the payment processing system server 112 (block 230). The merchant API keys consist of a "code" or "string" of digits which are used to authenticate the merchant. Each merchant has its own merchant API keys, which is kept secret by the merchant. Thus, both the token and the merchant API keys are associated with the merchant 118. In some embodiments, the token is only valid when used with the merchant API keys. The payment processing system server 112 confirms that the token and merchant API keys are legitimate (block 232), and, once the approval code from the bank (block 226)

is received, issues an approval code to the merchant server 120 (block 234). Once the approval code is received by the merchant server 120, the merchant server is able to complete the transaction (block 236).

The method for creating automatic expiring transactions for a credit card 200 thus enables the accountholder to enter an artificial expiration date other than the actual expiration date shown on the credit card. As long as the accountholder-specified artificial expiration date the same as or prior to the expiration date on the card, the bank server 104 will approve the transaction, assuming that the credit card is otherwise valid. Thus, in some embodiments, the accountholder may enter an expiration date that precedes the actual expiration date of the card (artificial expiration date) without the merchant server 118 knowing that the expiration date has changed. Further, the accountholder may change the expiration date for the merchant, whether at one of the merchant online interfaces or at a POS device at the merchant location.

When used with subscription-based transactions, the token ensures that the merchants do not overcharge customers against the wishes of the accountholder. The merchant is able to use the token for subscriptions as long as the transactions are processed before the artificial expiration date. The payment processing system will block any transactions using the token that are attempted after the artificial expiration date. The method 200 also enables the accountholder to set up different expiration dates for different online merchants, all from the same credit card.

Figure 3A:
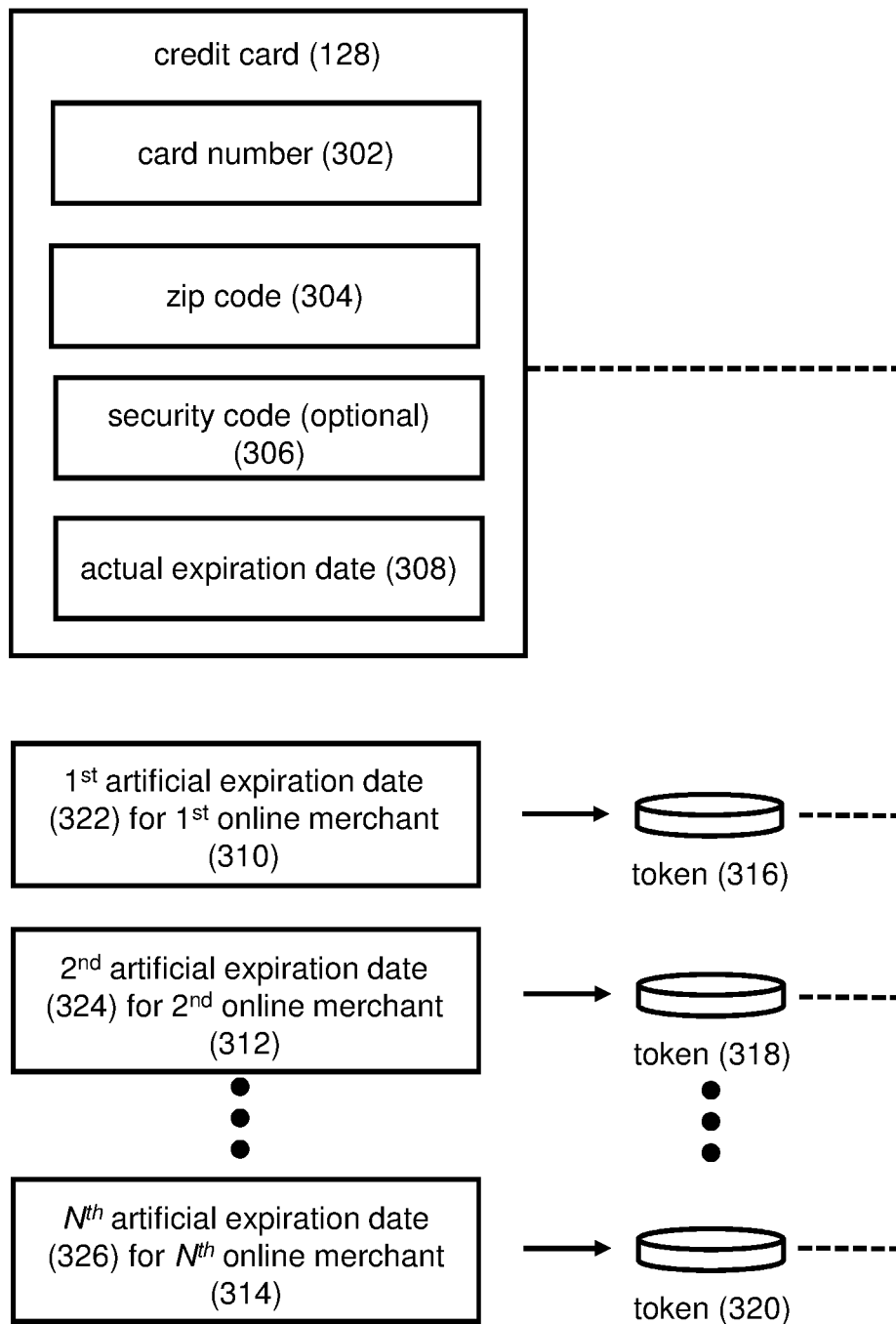
FIGS. 3A and 3B are illustrations of how the method for creating automatic expiring transactions for a credit card, from the perspective of the accountholder, according to some embodiments.
Figure 3B:
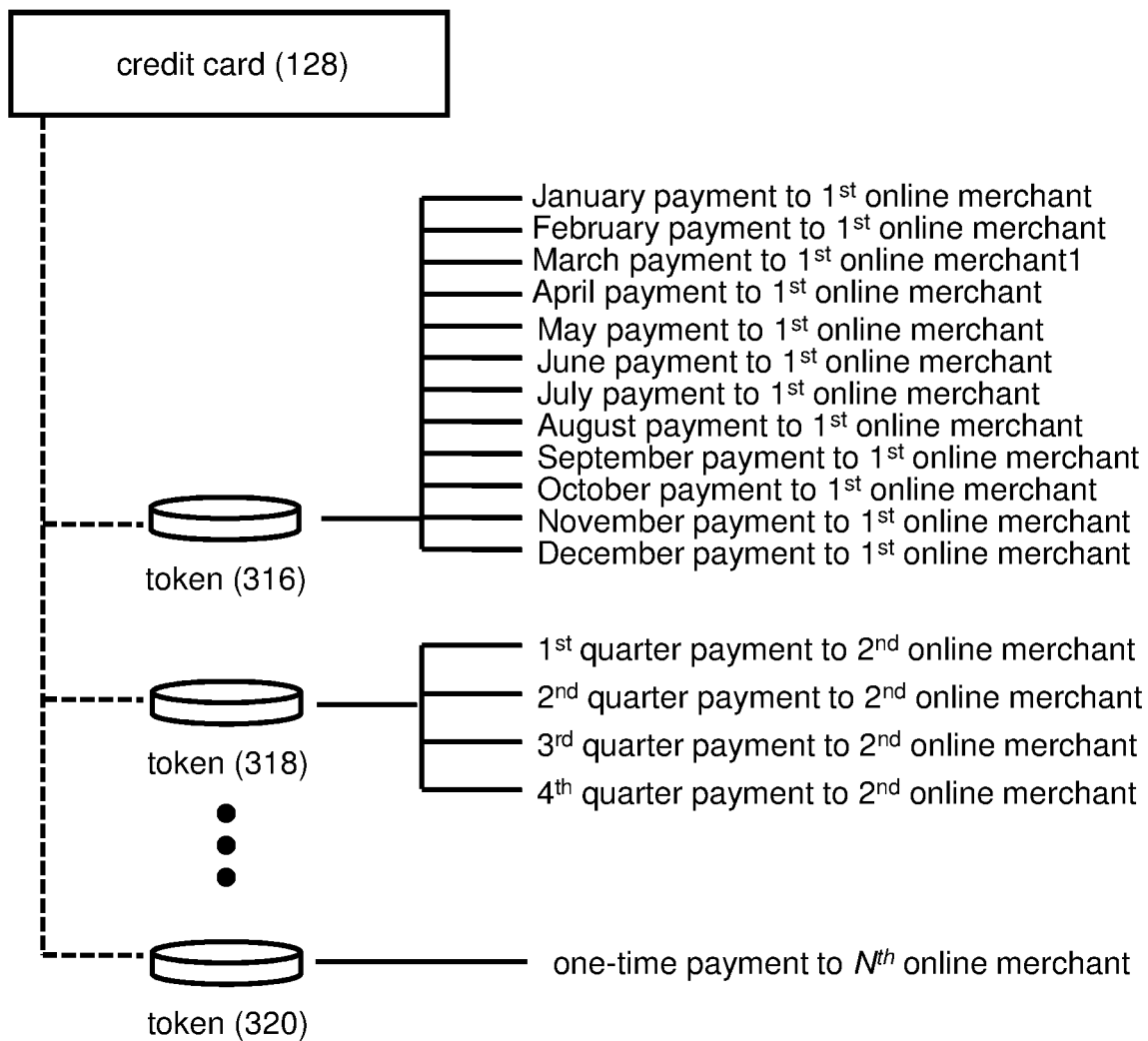

FIGS. 3A and 3B are illustrations 300A and 300B, respectively, of how the method for creating automatic expiring transactions for a credit card 200 operates, from the perspective of the accountholder, according to some embodiments. The accountholder, such as the accountholder 126 (FIG. 1), is the holder of a credit card 128. The credit card 128 includes the relevant information used in transactions, whether online or with POS devices at physical merchant locations, namely, a credit card number 302, a zip code 304, optionally, a security code 306, and an actual expiration date 308. While the zip code 304 is not part of the credit card, merchants often use zip codes as an additional security measure to ensure that the credit card belongs to the accountholder.

At the merchant online interface, whether a mobile app or a web page, once a transaction is to be completed by a user, the web page generally pops up a form window, such as when the user enters the "shopping cart" of the online interface. The user is instructed to enter the relevant credit card information, which generally consists of the information shown in FIG. 3A. Some merchants additionally request a complete billing address or at least an indication whether the mailing address, provided by the user when goods are to be shipped from the online merchant, is different than the billing address.

In some embodiments, according to the method for creating automatic expiring transactions for a credit card 200, the accountholder is able to enter an artificial expiration date in the form window. Further, this may be done for different online merchants using the same credit card information, resulting in a new token being generated for each online merchant, as described above. Thus, as illustrated in FIG. 3A, the accountholder may enter a first artificial expiration date 322 for a first online merchant 310, resulting in a first token 316 that may be used for online transactions with the first online merchant. The artificial expiration date is encoded as part of the token such that, after said date, the token would not be usable. Further, in some embodiments, the token 316 may only be used by the first online merchant 310, where the first online merchant sends the token 316 as well as its merchant API keys to the payment processing system for approval of the transaction. Similarly, the accountholder may enter a second artificial expiration date 324 for a second online merchant 312, resulting in a second token 318, and so on, until an $N^{th}$ token 320 is created based on an artificial expiration date 326 for an $N^{th}$ online merchant 314. The token 320 may not be used by the second online merchant 312 but may only be used with the $N^{th}$ online merchant 326. Each of the tokens 316, 318, ..., 320 are associated with the original credit card 128 and transactions using these tokens will be paid for by the accountholder by paying the credit card bill associated with the original credit card.

In the illustration 300B (FIG. 3B), the use of the tokens may be customized by the accountholder based on the relationship between the customer and the online merchants. For example, suppose the accountholder would like to buy a subscription from the first online merchant. The online merchant may provide a monthly service, such as for a service such as NETFLIX® or HULU®, and the accountholder does not want to come back every month and pay for the subscription. Further, the accountholder would like to be able to periodically review her relationship with the online merchant, and thus does not want the subscription to be open-ended. The accountholder therefore may request a subscription service with the online merchant and set up the first token 316 at the online merchant website. By setting an artificial expiration date of one year from the date of engagement with the merchant, the token 316 will expire in one year. This ensures that twelve payments, once a month, will be sent to the first online merchant, and no more. Although the credit card 128 may not expire in one years' time, the token 316 does expire in one year. Further, in some embodiments, the token 316 is to be used for transactions with the first online merchant, and thus may not be used for other online transactions. The first online merchant will successfully bill each month of the subscription by sending the token 316 plus the first merchant's API keys to the payment processing system. This limits the ability of a nefarious actor to obtain any benefit from the token 316.

The second token 318 is also used for a subscription, this time to be paid quarterly. Again, the accountholder may, upon entering the merchant online interface of the second merchant, request the subscription service and enter an artificial expiration date of one year from the date of engagement with the merchant, such that the token 318 will expire in a year. The accountholder may also specify on the merchant's web site or mobile app, that quarterly payments are to be made using the token 318. Each quarter, the second online merchant will send the token 318 plus the second merchant's API key to the payment processing system. This ensures that four quarterly payments will be sent to the second online merchant, and no more.

The method for creating automatic expiring transactions for a credit card 200 is not limited to subscription payments, in some embodiments, but may also be used for one-time payments to a merchant. In the third example, the token 320 is generated for an online transaction with an $N^{th}$ merchant. The accountholder may set the artificial expiration date for the next day, for example. As long as the transaction is completed before the next day expires, the token 320 is usable on the $N^{th}$ merchant's online interface for desired goods or services. Through an API call, the $N^{th}$ merchant will send both the token 320 and its merchant API keys to the payment processing system for transaction approval.

Figure 4:
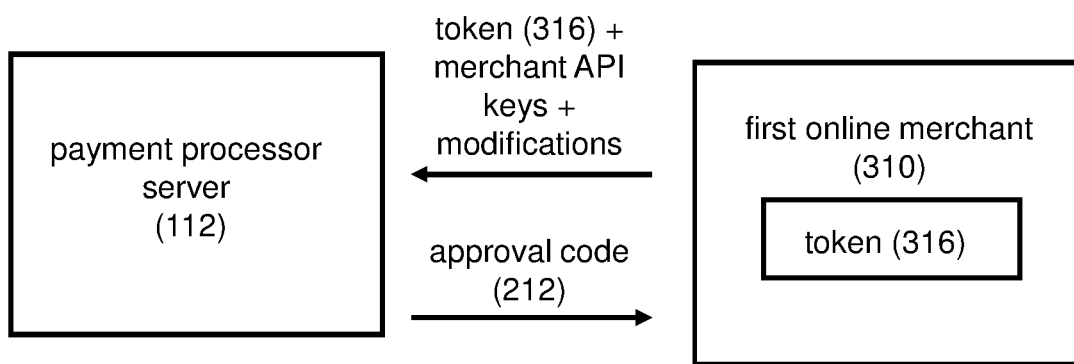
FIG. 4 is an illustration of how a subscription is modified by a merchant, according to some embodiments.

Suppose the first merchant 310 makes a change during the subscription period, such as an increase in the monthly service fee. FIG. 4 illustrates the operation 400 that takes place between the online merchant and the payment processing system server. In some embodiments, the merchant 310 sends the token 316, plus its merchant-specific API keys, plus the desired modifications, to the payment processing system server 112. The modifications may include, for example, a change to the monthly subscription amount or a change of the due date. As long as the token is known to be associated with the first merchant and the merchant-specific API keys are associated with that merchant, the payment processing system may approve the modification, and the token is still usable for the monthly subscription with the first merchant. Neither the bank 102 nor the accountholder 126 are involved in the change to the subscription, in some embodiments.

Figure 5:
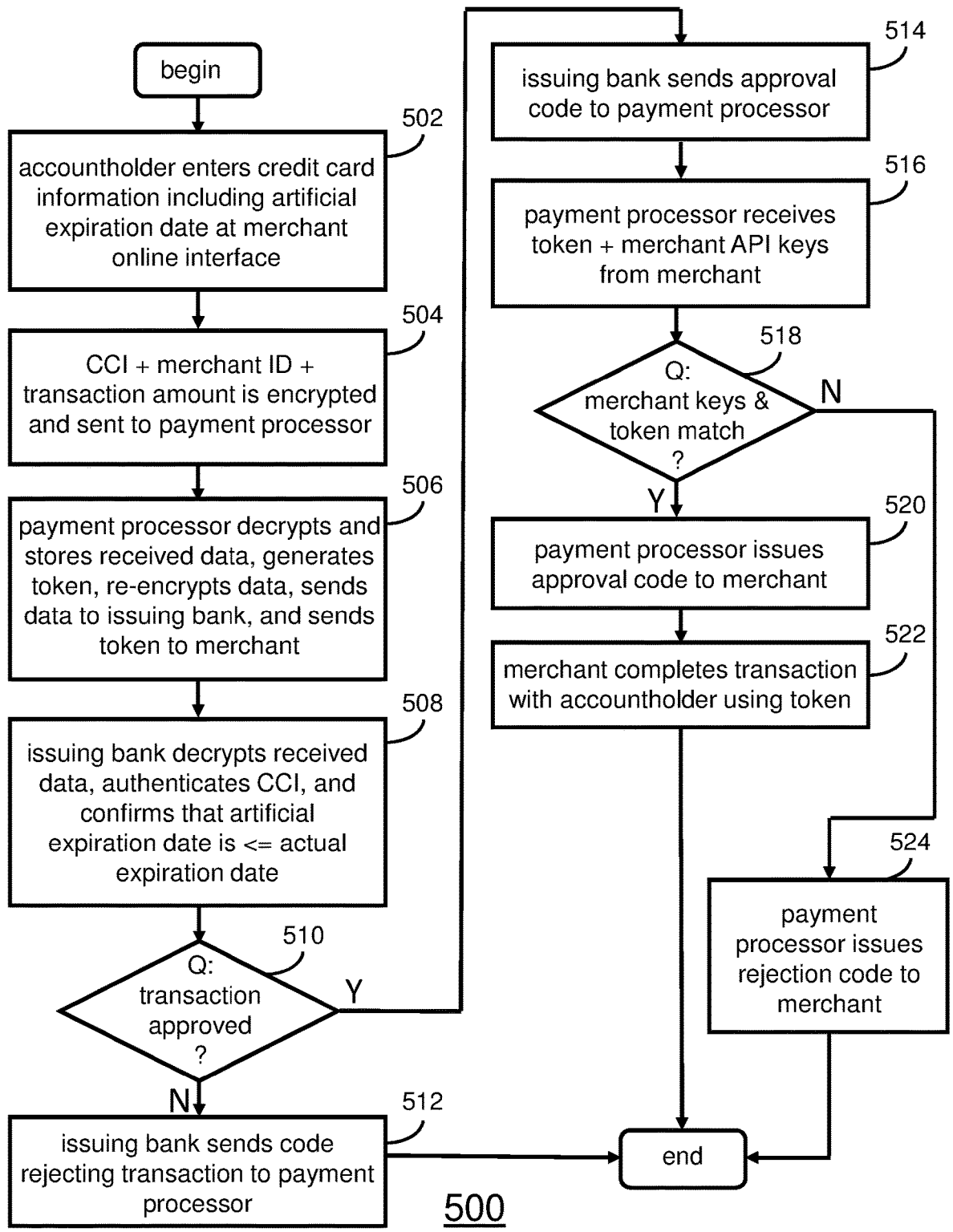
FIGS. 5-8 are flow diagrams illustrating operations of the method for creating automatic expiring transactions for a credit card, according to some embodiments.
Figure 6:
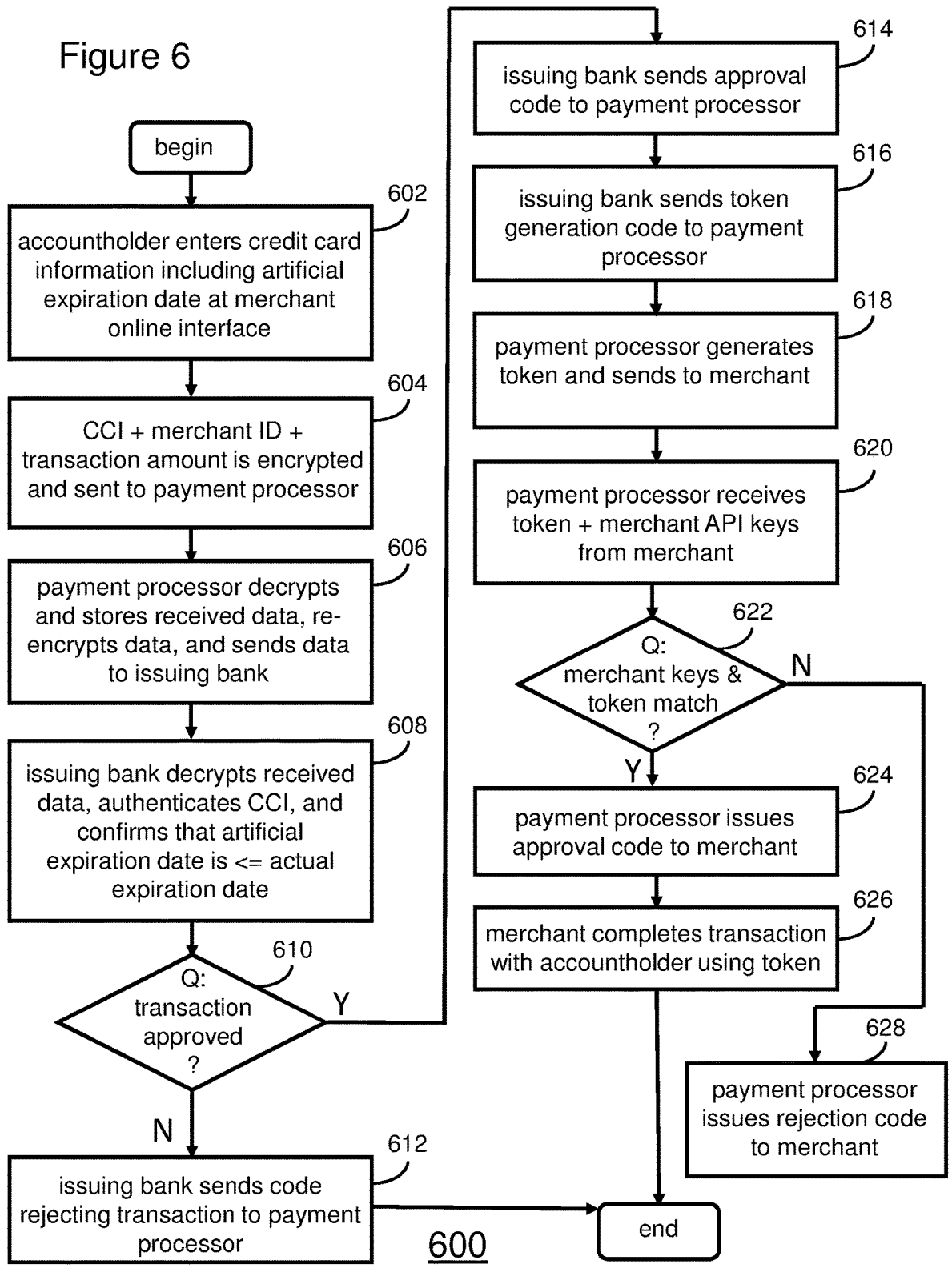
Figure 7:
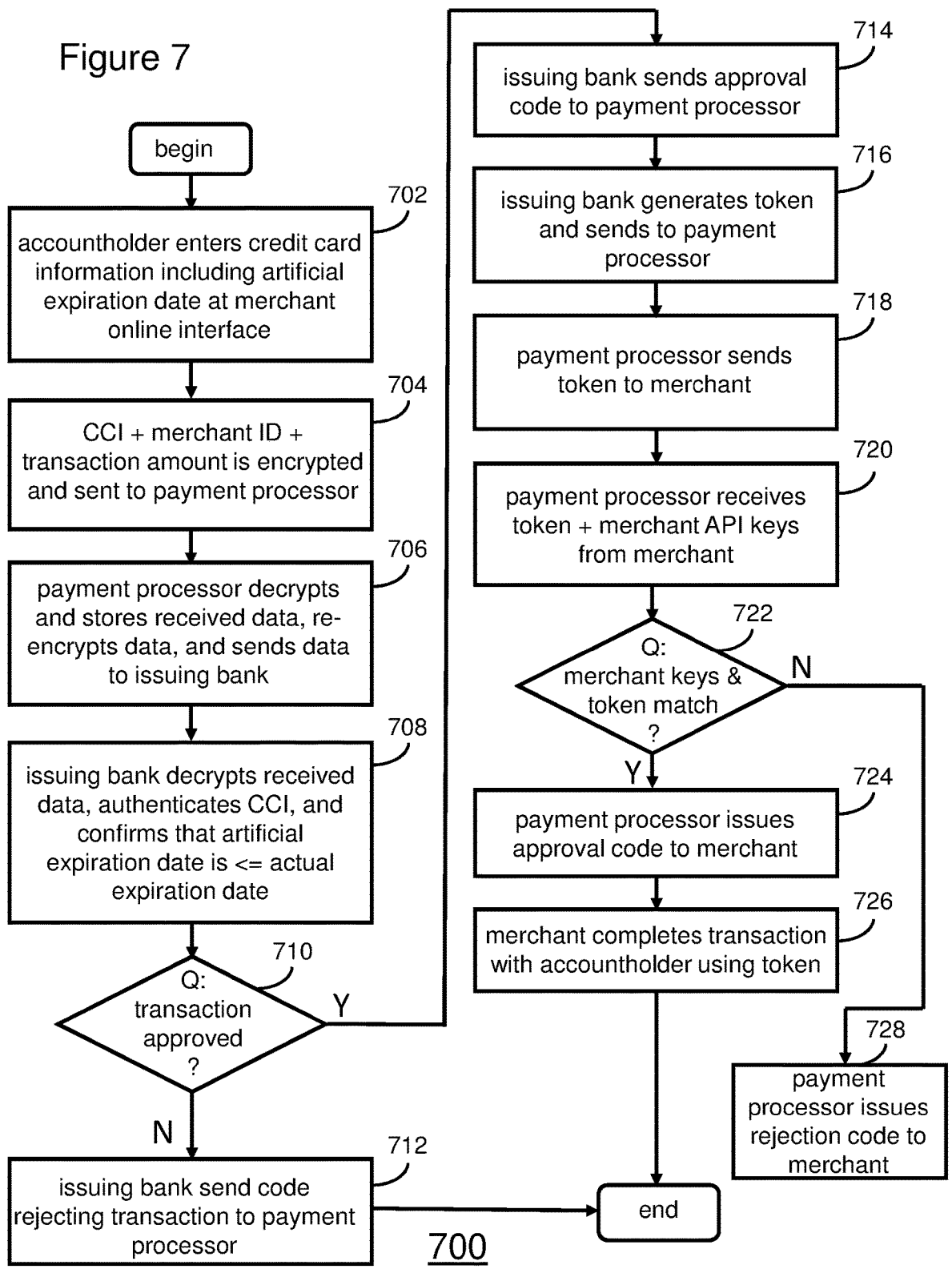

FIGS. 5, 6, and 7 are flow diagrams depicting three different embodiments for performing the method for creating automatic expiring transactions for a credit card. In the operations 500, the payment processing system generates the token without prompting from the issuing bank. In the operations 600, the payment processing system generates the token after being prompted to do so by the issuing bank. In the operations 700, the issuing bank generates the token and sends the token to the payment processing system.

First looking at the operations 500 (FIG. 5), the accountholder enters credit card information including the artificial expiration date at a merchant online interface or at a POS device at the merchant (block 502). The credit card information, plus a merchant identifier, plus the transaction amount, is encrypted and sent to the payment processing system (block 504). The payment processing system decrypts and stores the received information, generates a token, re-encrypts the sensitive data, and sends the encrypted information to the issuing bank. Simultaneously or subsequently, the payment processing system sends the token to the merchant (block 506). The issuing bank decrypts the received data, authenticates the credit card information, and confirms that the artificial expiration date satisfies the criteria, namely, that the artificial expiration date is not a date later than the actual expiration date on the credit card (block 508). In some embodiments, the bank also confirms that the artificial expiration date is on or after the current date. If the transaction is approved, the issuing bank sends an approval code to the payment processing system (block 514). If, instead, the transaction is not approved, the issuing bank sends a rejection code to the payment processing system (block 512).

After receiving the approval code, the payment processing system subsequently receives the token previously sent to the merchant (block 506), plus the merchant API keys, from the merchant (block 516). If the payment processing system confirms that the merchant API keys and the token match or, in other words, the merchant API keys belong to the merchant and the token was issued for the merchant (block 518), the payment processing system issues an approval code (block 520) for the transaction. Otherwise, the payment processing system issues a rejection code to the merchant (block 524).

Where the merchant receives the approval code, the merchant is able to complete the transaction with the accountholder using the token (block 522). Although the merchant receives only one approval code, FIG. 5 shows that the transaction with the merchant is not approved unless both the issuing bank approval code (block 514) and the payment processing system approval code (block 520) are issued.

In the operations 600 (FIG. 6), the payment processing system generates the token only after receiving an API call from the issuing bank with instructions to generate the token. The accountholder enters credit card information including the artificial expiration date at a merchant online interface or at a POS device at the merchant (block 602). The credit card information, plus a merchant identifier, plus the transaction amount, is encrypted and sent to the payment processing system (block 604). The payment processing system decrypts and stores the received information, re-encrypts the sensitive data, and sends the encrypted information to the issuing bank (block 606). The issuing bank decrypts the received data, authenticates the credit card information, and confirms that the artificial expiration date satisfies the criteria, namely, that the artificial expiration date is not a date later than the actual expiration date on the credit card and is also a date after the current date (block 608). If the transaction is approved, the issuing bank sends an approval code to the payment processing system (block 614). The issuing bank also sends a token generating code to the payment processing system (block 616). The operations of blocks 614 and 616 may occur in reverse order or simultaneously. If, instead, the transaction is not approved, the issuing bank sends a rejection code to the payment processing system (block 612).

After receiving the approval code and the instructions to generate the token from the issuing bank, the payment processing system generates the token and sends it to the merchant (block 618). Subsequently, the payment processing system receives the token back from the merchant, along with the merchant API keys (block 620). If the payment processing system confirms that the merchant API keys belong to the merchant and the token was issued for the merchant (block 622), the payment processing system issues an approval code (block 624) for the transaction. Otherwise, the payment processing system issues a rejection code to the merchant (block 628).

Where the merchant receives the approval code, the merchant is able to complete the transaction with the accountholder using the token (block 626). Again, although the merchant receives only one approval code, FIG. 6 shows that the transaction with the merchant is not approved unless both the issuing bank approval code (block 614) and the payment processing system approval code (block 624) are issued.

In the operations 700 (FIG. 7), the issuing bank generates the token. As in the previous two examples, the accountholder enters credit card information including the artificial expiration date at a merchant online interface or at a POS device at the merchant (block 702). The credit card information, plus a merchant identifier, plus the transaction amount, is encrypted and sent to the payment processing system (block 704). The payment processing system decrypts and stores the received information, re-encrypts the sensitive data, and sends the encrypted information to the issuing bank (block 706). The issuing bank decrypts the received data, authenticates the credit card information, and confirms that the artificial expiration date is valid (block 708). If the transaction is approved, the issuing bank sends an approval code to the payment processing system (block 714). If, instead, the transaction is not approved, the issuing bank sends a rejection code to the payment processing system (block 512).

After sending the approval code, the issuing bank generates the token and sends it to the payment processing system (block 716). Although the operations 700 show the approval code being sent first, the token may be generated first and sent to the payment processing system before the approval code is sent. The payment processing system then sends the token to the merchant (block 718). Subsequently, the payment processing system receives the token it just sent to the merchant (block 718), plus the merchant API keys, from the merchant (block 720). If the payment processing system confirms that the merchant API keys and the token match (block 722), the payment processing system issues an approval code (block 724) for the transaction. Otherwise, the payment processing system issues a rejection code to the merchant (block 728).

Where the merchant receives the approval code, the merchant is able to complete the transaction with the accountholder using the token (block 726).

Figure 8:
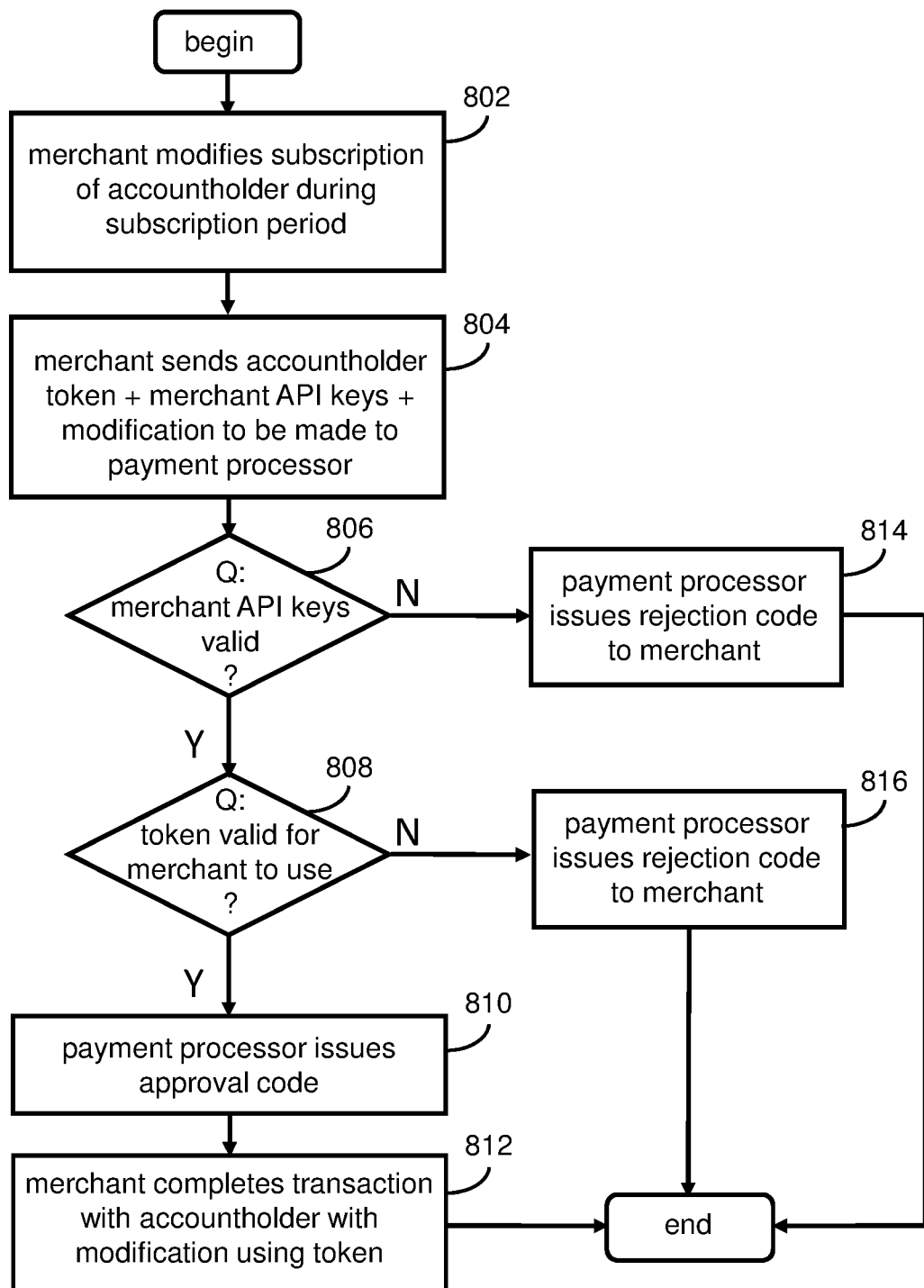

FIG. 8 is a flow diagram illustrating operations 800 in which the merchant modifies a subscription already in place with an accountholder. It is assumed that the accountholder set up a subscription with the merchant using a token with an artificial expiration date, as described herein. First, the merchant wants to modify a subscription of the accountholder during the subscription period (block 802). The merchant sends the accountholder token, plus the merchant API keys, plus the modification to be made, to the payment processing system (block 804). The payment processing system validates the merchant API keys (block 806), as described above. If the merchant API keys are not valid, the payment processing system issues a rejection code to the merchant (block 814) and the transaction fails. The payment processing system also validates the token (block 808), as described above. If the token is not valid, the payment processing system issues a rejection code to the merchant (block 814) and the transaction fails. The operations of blocks 806 and 808 may be done in reverse order. If either query fails, the attempted modification by the merchant fails.

If, instead, both queries are answered in the affirmative, the payment processing system issues the approval code (block 810). The merchant is then able to complete the transaction with the accountholder with the modification using the token (block 812). The operations 800 show that neither the issuing bank nor the accountholder are involved in the modification of the subscription. Nevertheless, the accountholder is able to contact the merchant and cancel the subscription at any time, such as when the accountholder objects to an increase in fees, or for any reason.

Figure 9:
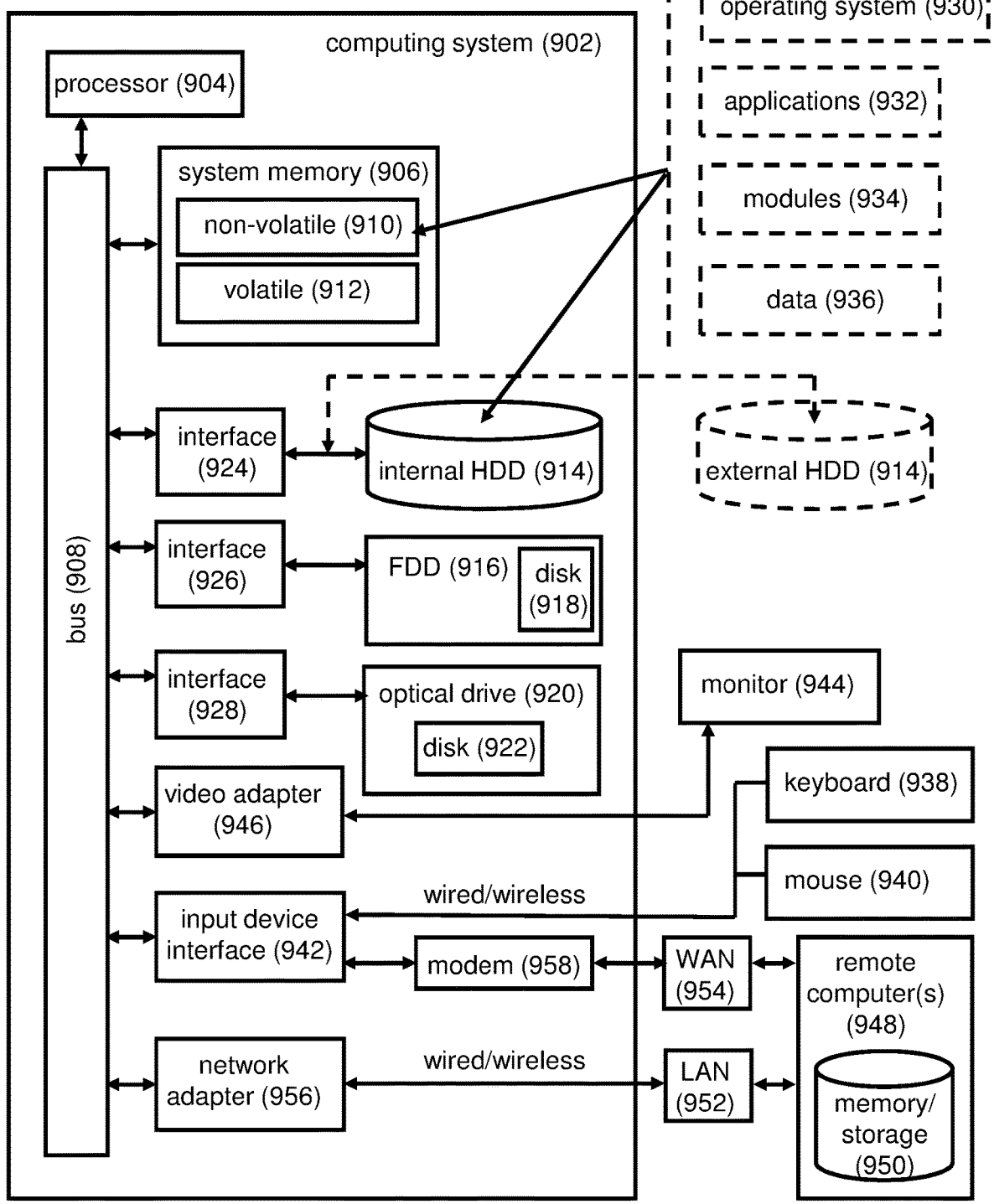
FIG. 9 is an illustration of an exemplary computing architecture comprising for implementing the system and method for creating automatic expiring transactions for a credit card, according to some embodiments.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100 and method 200 for creating automatic expiring transactions for a credit card. In some embodiments, computing system 902 may be representative, for example, of the mobile devices used in implementing the system 100 and method 200 for creating automatic expiring transactions for a credit card. The embodiments are not limited in this context. More generally, the computing architecture 900 is configured to implement all logic, applications, systems, methods, apparatuses, and functionality described herein.

As used in this application, the terms "system" and "component" and "module" are intended to refer to a computer-related entity, either hardware, a combination of hardware and software, software, or software in execution, examples of which are provided by the exemplary computing architecture 900. For example, a component may be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information may be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 may be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 904.

The system bus 908 provides an interface for system components including, but not limited to, the system memory 906 to the processor 904. The system bus 908 may be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 is not a propagating signal divorced from the underlying hardware of the computing system 902 and is thus non-transitory. The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 may include non-volatile memory 910 and/or volatile memory 912. A basic input/output system (BIOS) may be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 may be connected to the system bus 908 by an HDD interface 924, an FDD interface 926 and an optical drive interface 928, respectively. The HDD interface 924 for external drive implementations may include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules may be stored in the drives and memory units 910, 912, including an operating system 930, one or more application programs 932, other program modules 934, and program data 936. In one embodiment, the one or more application programs 932, other program modules 934, and program data 936 may include, for example, the various applications and/or components of the system 100 and method 200 for creating automatic expiring transactions for a credit card.

A user may enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but may be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 may be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computing system 902 is connected to the LAN 952 through a wire and/or wireless communication network interface or adaptor 956. The adaptor 956 may facilitate wire and/or wireless communications to the LAN 952, which may also include a wireless access point disposed thereon for communicating with the wireless functionality of the adaptor 956.

When used in a WAN networking environment, the computing system 902 may include a modem 958, or is connected to a communications server on the WAN 954 or has other means for establishing communications over the WAN 954, such as by way of the Internet. The modem 958, which may be internal or external and a wire and/or wireless device, connects to the system bus 908 via the input device interface 942. In a networked environment, program modules depicted relative to the computing system 902, or portions thereof, may be stored in the remote memory/storage device 950. It will be appreciated that the network connections shown are exemplary and other means of establishing a communications link between the computers may be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication may be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network may be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores", may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operation in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. An apparatus, comprising:
a processor; and
memory coupled to the processor, the memory comprising instructions that, when executed by the processor, cause the processor to:
receive, over a wireless communication network, an encrypted transaction object from a payment processing system, the encrypted transaction object being part of an Application Programming Interface (API) communication received from the payment processing system, wherein the encrypted transaction object is associated with a credit card number of a customer;
decrypt the encrypted transaction object, resulting in credit card information comprising the credit card number of the customer, an artificial expiration date, a merchant identifier (ID), and a transaction amount, wherein the artificial expiration date is different from an actual expiration date associated with the credit card of the customer and the transaction amount is to be charged to the credit card of the customer by a merchant associated with the merchant ID as a payment for goods or services to be received by the customer from the merchant;
in response to an affirmative confirmation of both the artificial expiration date being prior to the actual expiration date and on or after a current date,
authenticate the credit card information as both belonging to the customer and having sufficient funds for the payment;
by way of a second API communication transmitted to the payment processing system, either:
in response to an affirmative authentication, approve the payment to the merchant by sending a transaction approval code, wherein the payment is made using a token associated with both the credit card number of the customer and the merchant; or
if the confirmation of both the artificial expiration date being prior to the actual expiration date and on or after the current date fails, or if the authentication of the credit card information as both belonging to the customer and having sufficient funds for the payment fails, deny the payment to the merchant by sending a transaction denial code.

2. The apparatus of claim 1, further comprising instructions that, when executed by the processor, cause the processor to:
receive, over the wireless communication network, a second encrypted transaction object from the payment processing system, the second encrypted transaction object being part of a third API communication from the payment processing system, wherein the second encrypted transaction object was received by the payment processing system from a second merchant;
decrypt the second encrypted transaction object, resulting in the credit card number, a second artificial expiration date, a second merchant ID, and a second transaction amount, wherein the second transaction amount is to be charged to the credit card of the customer by the second merchant as a second payment for goods or services to be received by the customer from the second merchant;
in response to a second affirmative confirmation of the both the second artificial expiration date being prior to the actual expiration date and on or after the current date, authenticate the credit card information as both belonging to the customer and having sufficient funds for the second payment; and by way of a fourth API communication transmitted to the payment processing system, either:
- in response to a second affirmative authentication, approve the second payment to the second merchant by sending a second transaction approval code, wherein the second payment is made using a second token associated with both the credit card and the second merchant; or
- if the confirmation of both the artificial expiration date being prior to the actual expiration date and on or after the current date fails, or if the authentication of the credit card information as both belonging to the customer and having sufficient funds for the payment fails, or if the second merchant ID is not associated with the second merchant, deny the second payment to the second merchant by sending a second transaction denial code.

3. The apparatus of claim 1, further comprising instructions that, when executed by the processor, cause the processor to:
- instruct the payment processing system to generate the token, the token to have the artificial expiration date, wherein the token is used for one or more payments to the merchant on or before the artificial expiration date.

4. The apparatus of claim 1, wherein the encrypted transaction objects are received by the payment processing system from a point of sale device at a premises of the merchant.

5. The apparatus of claim 1, wherein the encrypted transaction objects are received by the payment processing system from a mobile application of the merchant.

6. The apparatus of claim 1, wherein the encrypted transaction objects are received by the payment processing system from a web page of the merchant.

7. The apparatus of claim 2, wherein the payment and the second payment are for a subscription of the merchant.

* * * * *